(12) United States Patent
Lee

(10) Patent No.: US 8,112,854 B2
(45) Date of Patent: Feb. 14, 2012

(54) TOOL HOLDING DEVICE FOR A FIVE-AXIS LATHE

(75) Inventor: Kuo-Yuan Lee, Taichung (TW)

(73) Assignee: Wey Yii Corp., Taichung (TW)

( * ) Notice: Subject to any disclaimer, the term of this patent is extended or adjusted under 35 U.S.C. 154(b) by 164 days.

(21) Appl. No.: 12/754,173

(22) Filed: Apr. 5, 2010

(65) Prior Publication Data

US 2010/0288090 A1    Nov. 18, 2010

(30) Foreign Application Priority Data

May 15, 2009    (TW) .............................. 98208497 U

(51) Int. Cl.
*B23B 21/00*    (2006.01)
*B23B 29/32*    (2006.01)

(52) U.S. Cl. ............................................. 29/39; 82/159

(58) Field of Classification Search .................... 82/117, 82/120, 121, 137, 161, 159; 29/27 R, 50, 29/35.5, 39, 48.5 R
See application file for complete search history.

(56) References Cited

U.S. PATENT DOCUMENTS

| | | | | |
|---|---|---|---|---|
| RE15,157 E | * | 7/1921 | Muller ............................. | 82/117 |
| 1,918,331 A | * | 7/1933 | Groene et al. .................... | 82/19 |
| 2,184,377 A | * | 12/1939 | Bickel .............................. | 82/17 |
| 2,465,393 A | * | 3/1949 | Obadiah .......................... | 82/12 |
| 3,486,209 A | * | 12/1969 | Shultz et al. .................. | 29/27 R |
| 4,006,518 A | * | 2/1977 | Rudolph et al. ................. | 29/39 |
| 4,180,894 A | * | 1/1980 | Link ............................... | 29/36 |
| 7,448,304 B2 | * | 11/2008 | Kikuchi et al. ................. | 82/124 |
| 2010/0288090 A1 | * | 11/2010 | Lee ................................. | 82/137 |

* cited by examiner

*Primary Examiner* — Will Fridie, Jr.
(74) *Attorney, Agent, or Firm* — Osha • Liang LLP

(57) ABSTRACT

A tool holding device is disposed between a headstock unit and a tailstock unit of a five-axis lathe, and includes a saddle driven to move longitudinally, a cross-slide riding on the saddle and driven to move transversely, a turntable platform disposed on a base mount that is disposed on the cross-slide and driven to revolve about an upright axis, and a tool post mounted on a base rest that is disposed on the turntable platform and driven to move uprightly. An indexable turret is disposed on the tool post for holding tool bits such that the five-axis lathe can perform movements about five axes to machine a workpiece so as to obtain a complicated geometric shape, thereby reducing setup time and errors and increasing production.

5 Claims, 7 Drawing Sheets

TOOL HOLDING DEVICE FOR A FIVE-AXIS LATHE

CROSS-REFERENCE TO RELATED APPLICATION

This application claims priority of Taiwanese Application No. 098208497, filed on May 15, 2009, the disclosure of which is herein incorporated by reference.

BACKGROUND OF THE INVENTION

1. Field of the Invention

This invention relates to a five-axis lathe, more particularly to a tool holding device for a composite CNC (Computer-Numerical-Controlled) machine lathe that has a five-axis construction and that can be used to perform lathing, milling and other machining operations.

2. Description of the Related Art

A conventional CNC machine lathe generally includes a machine bed, a headstock disposed on one side of the machine bed, a tailstock disposed on the other side of the machine bed, and a cutting unit disposed therebetween for performing lathing, milling, and other machining operations. However, with such machine lathe, only an axial end surface of a workpiece can be machined. Specific machine lathe is additionally required to perform other processing operations so as to form a complicated product. Thus, precision is difficult to control and production output may be adversely affected.

SUMMARY OF THE INVENTION

An object of the present invention is to provide a tool holding device for a five-axis lathe which can be used to machine a workpiece to obtain a product with a complicated geometric shape, which can be easily operated, and which can enhance machining accuracy so as to increase production.

According to this invention, the tool holding device is disposed between a headstock unit and a tailstock unit of a five-axis lathe, and includes a saddle, a cross-slide, an angularly displaceable unit, and a tool mounting post unit.

The saddle is driven by a first linear motion drive mechanism to move along a first linear track in a longitudinal direction. The cross-slide is configured to ride on the saddle and is movable by a second linear motion drive mechanism along a second linear track that extends in a direction transverse to the longitudinal direction. The angularly displaceable unit includes a base mount disposed on the cross-slide, and a turntable platform which is disposed on the base mount and which is revolvable by a rotation drive mechanism about a revolving axis in an upright direction that is transverse to the longitudinal and transverse directions. The tool mounting post unit includes a base rest disposed on the turntable platform, a tool post which is adapted to hold a tool bit, and which is mounted on the base rest to be movable along a third linear track in the upright direction, and a third linear motion drive mechanism disposed to drive the tool post to move along the third linear track.

By means of the third linear motion drive mechanism which drives movement of the tool bit in the upright direction, and by means of the rotation drive mechanism which drives rotation of the tool bit about the revolving axis, the five-axis lathe can perform movement about five different axes simultaneously to machine a workpiece so as to obtain a complicated geometric shape with precision in a single set-up, thereby reducing setup time and errors and increasing production.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
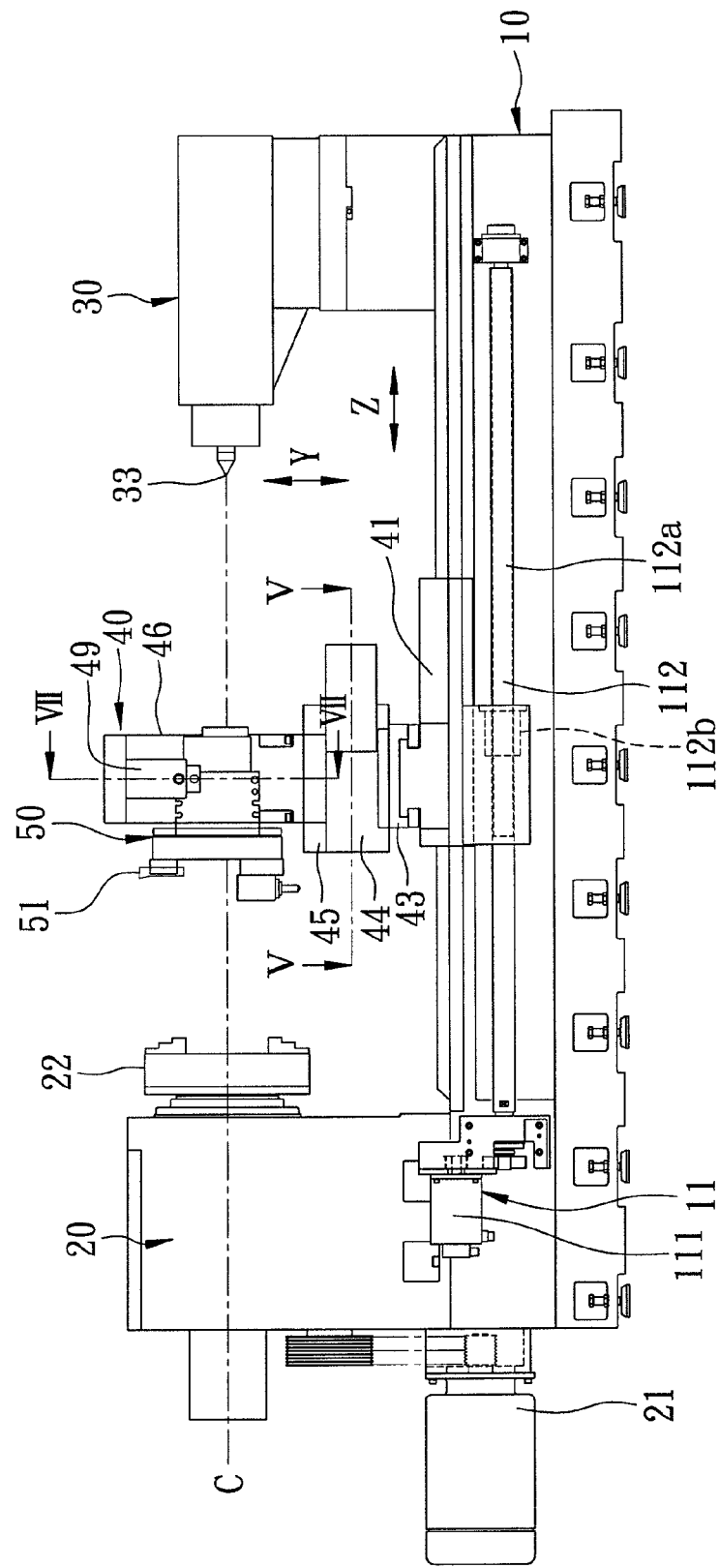
FIG. 1 is a schematic view of a five-axis lathe incorporating a tool holding device of the preferred embodiment according to this invention.
Figure 2:
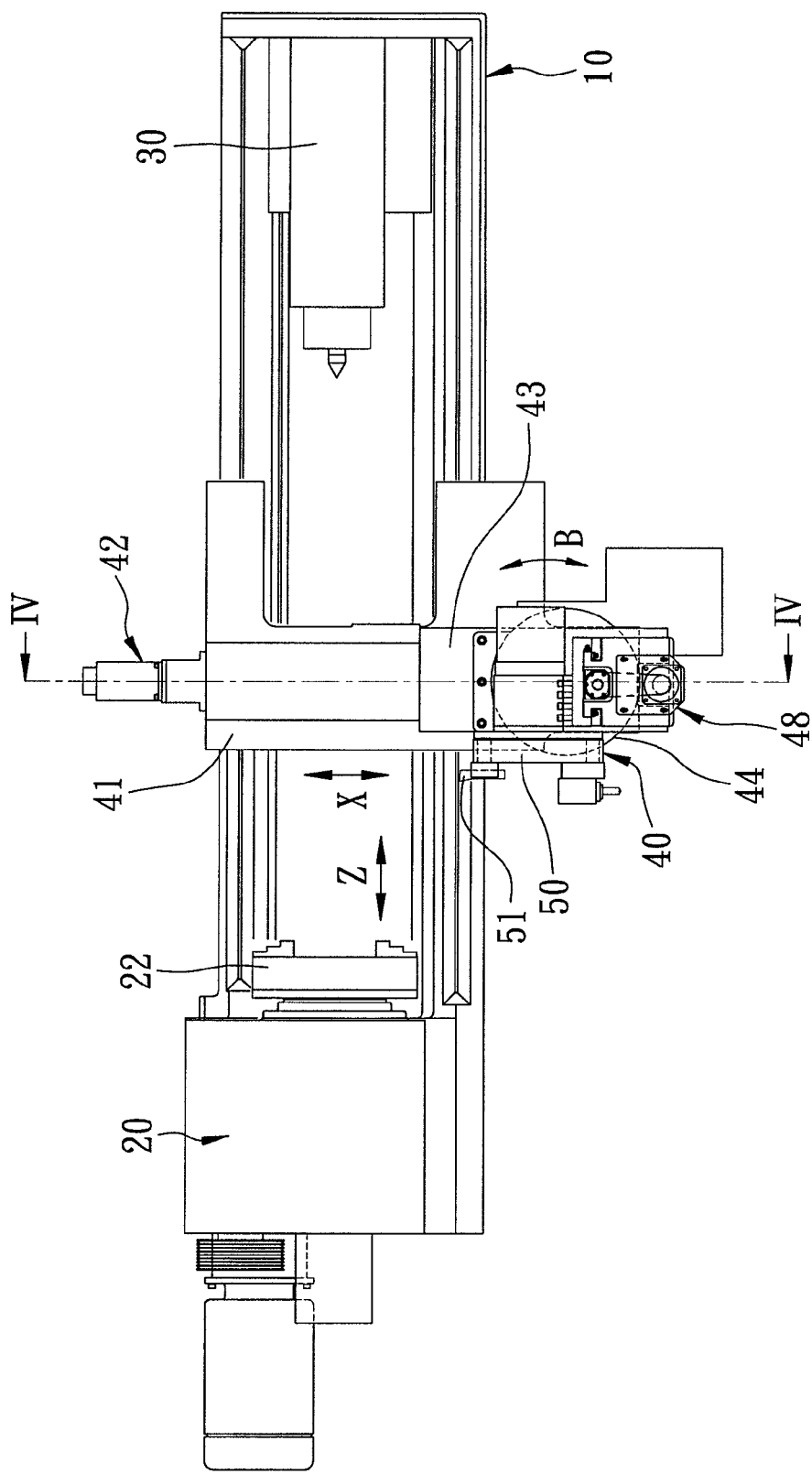
FIG. 2 is a top view of the five-axis lathe of FIG. 1.
Figure 3:
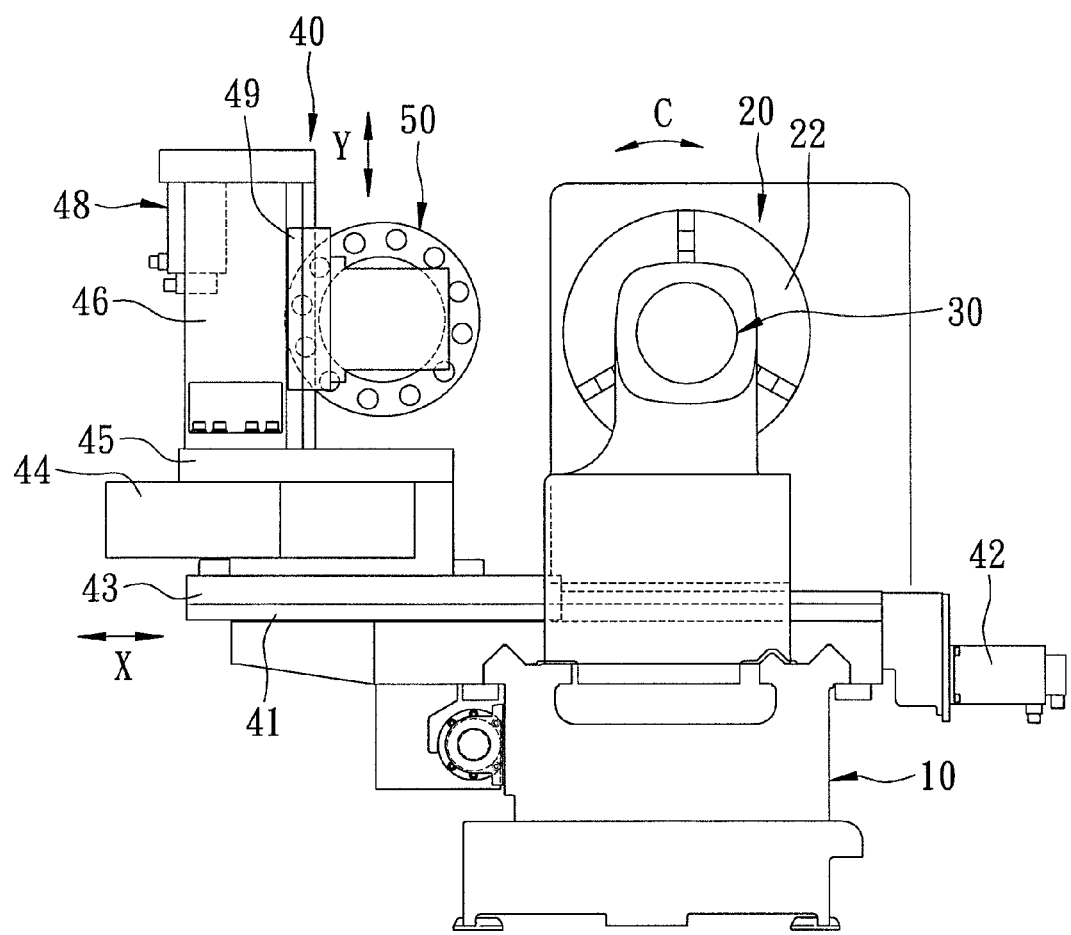
FIG. 3 is a side view of the five-axis lathe of FIG. 1.

Referring to FIGS. 1 to 3, the preferred embodiment of a tool holding device 40 according to the present invention is adapted to be mounted on a five-axis lathe. The lathe is, for example, a five-axis platform-type composite CNC machine tool, and includes a machine bed 10, a headstock unit 20 mounted on one side of the machine bed 10, and a tailstock unit 30 mounted on the other side of the machine bed 10. The machine bed 10 is provided with a first linear motion drive mechanism 11. In this embodiment, the first linear motion drive mechanism 11 has a first power motor 111 and a first ball screw 112 which includes a first threaded shaft (112*a*) that extends along a first linear track extending in a longitudinal direction (Z) and that is driven to rotate by the first power motor 111, and a first ball bearing (112*b*) that is coupled to the first threaded shaft (112*a*) to be moved along the first linear track. The headstock unit 20 has a spindle which extends along a spindle axis (C) in the longitudinal direction (Z), which has a chuck 22 at an end thereof for holding a workpiece, and which is driven by a spindle motor 21 to revolve about the spindle axis (C). The tailstock unit 30 is provided with a dead center 33 disposed for supporting an outboard end of the workpiece held by the chuck 22 along the spindle axis (C).

With reference to FIGS. 4 to 7, the tool holding device 40 of this embodiment is shown to comprise a saddle 41, a cross-slide 43, a second linear motion drive mechanism 42, an angularly displaceable unit, a rotation drive mechanism 47, a tool mounting post unit, and an indexable turret 50.

The saddle 41 is disposed on the first ball bearing (112*b*) to be driven by the first linear motion drive mechanism 11 to move along the first linear track. The saddle 41 defines a second linear track in a direction (X) transverse to the longitudinal direction (Z).

The cross-slide 43 is configured to ride on the saddle 41 to be movable along the second linear track, and has an upper major wall facing upwardly.

Figure 4:
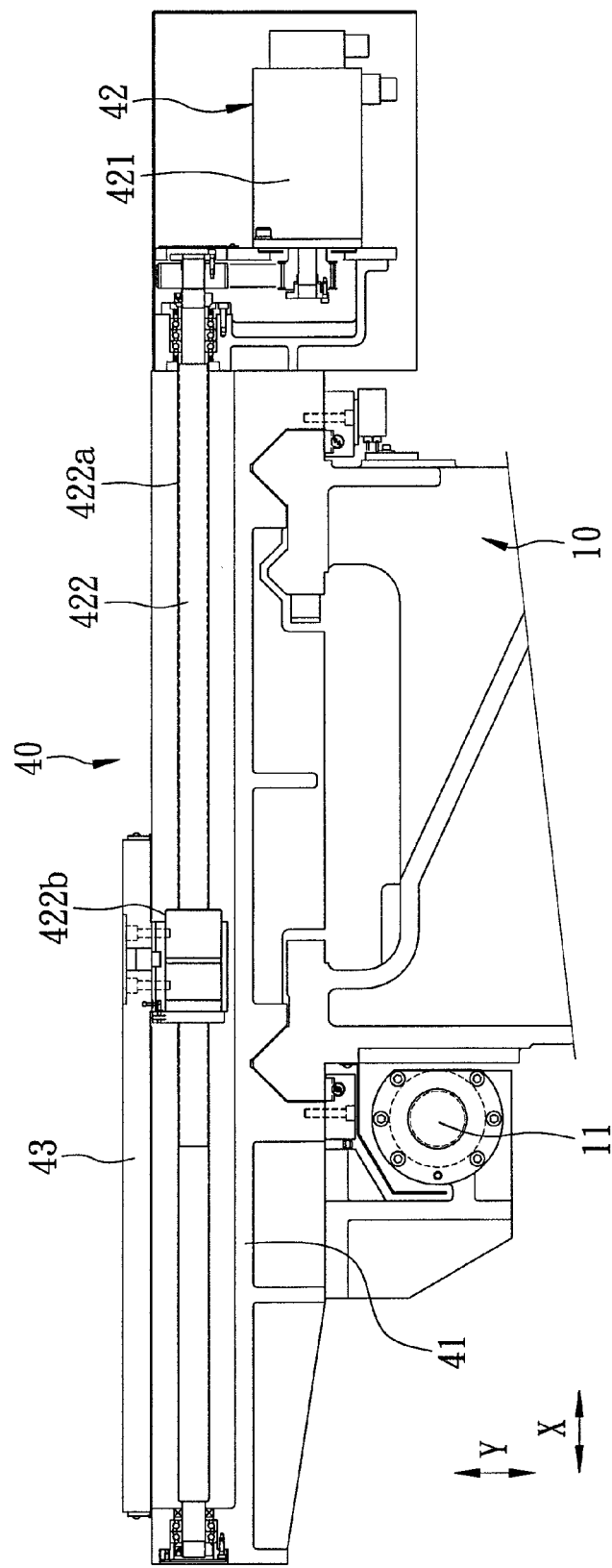
FIG. 4 is a sectional view taken along line IV-IV of FIG. 2.

The second linear motion drive mechanism 42 is disposed to drive the cross-slide 43 to move along the second linear track. As shown in FIG. 4, the second linear motion drive mechanism 42 has a second power motor 421, and a second ball screw 422 having a second threaded shaft (422*a*) which extends along the second linear track, and which is driven to rotate by the second power motor 421, and a second ball bearing (422b) which is coupled to the second threaded shaft (422a). The cross-slide 43 is mounted on the second ball bearing (422b) so as to be moved along the second linear track.

The angularly displaceable unit includes a base mount 44 and a turntable platform 45. The base mount 44 has a bottom major mount surface which is disposed on the upper major wall of the cross-slide 43, and a top major mount surface which is opposite to the bottom major mount surface in an upright direction (Y) that is transverse to both the longitudinal direction (Z) and the transverse direction (X). The turntable platform 45 is disposed on the top major mount surface of the base mount 44 and is revolvable about a revolving axis (B) in the upright direction (Y).

Figure 5:
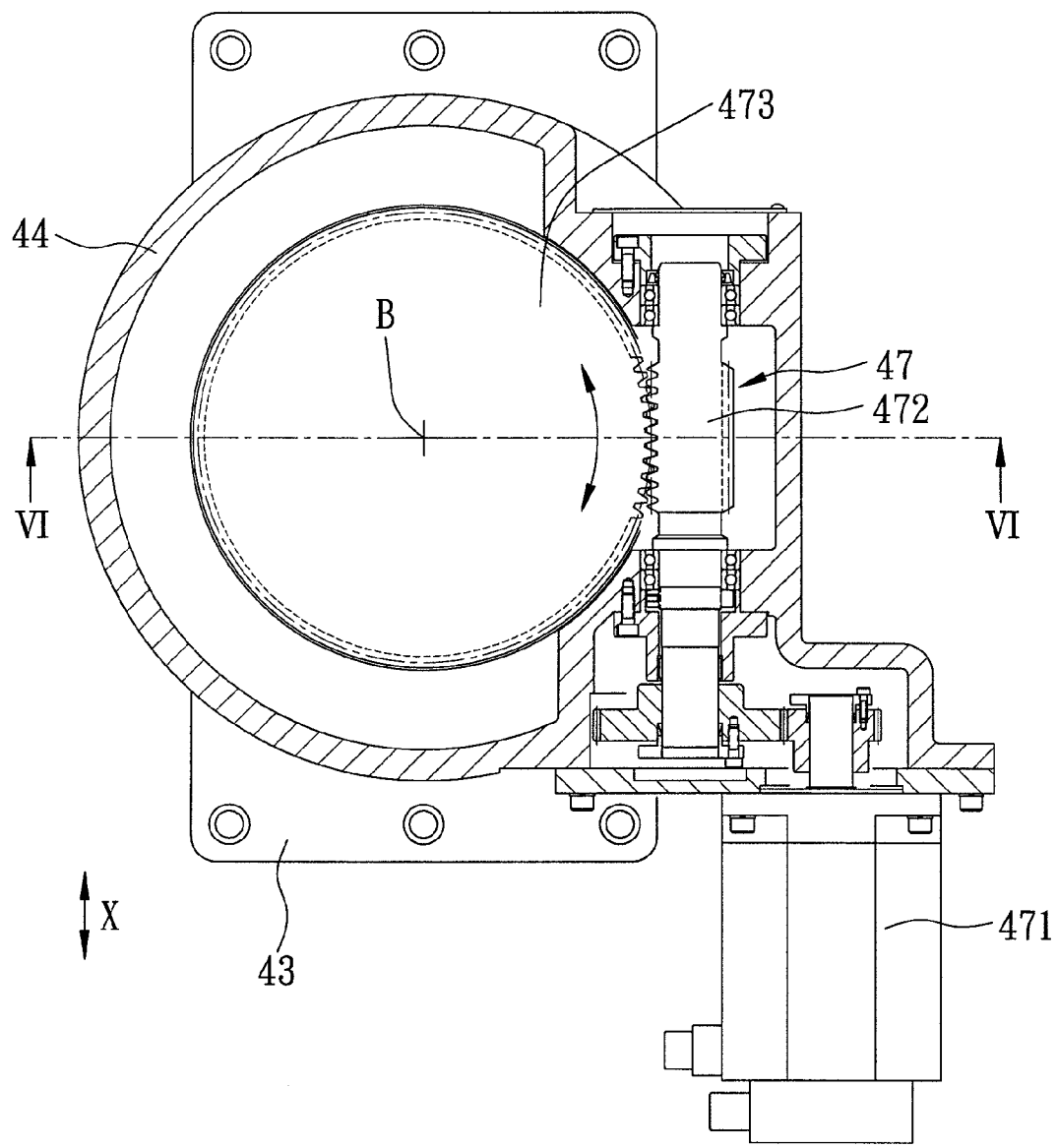
FIG. 5 is a sectional view taken along line V-V of FIG. 1.
Figure 6:
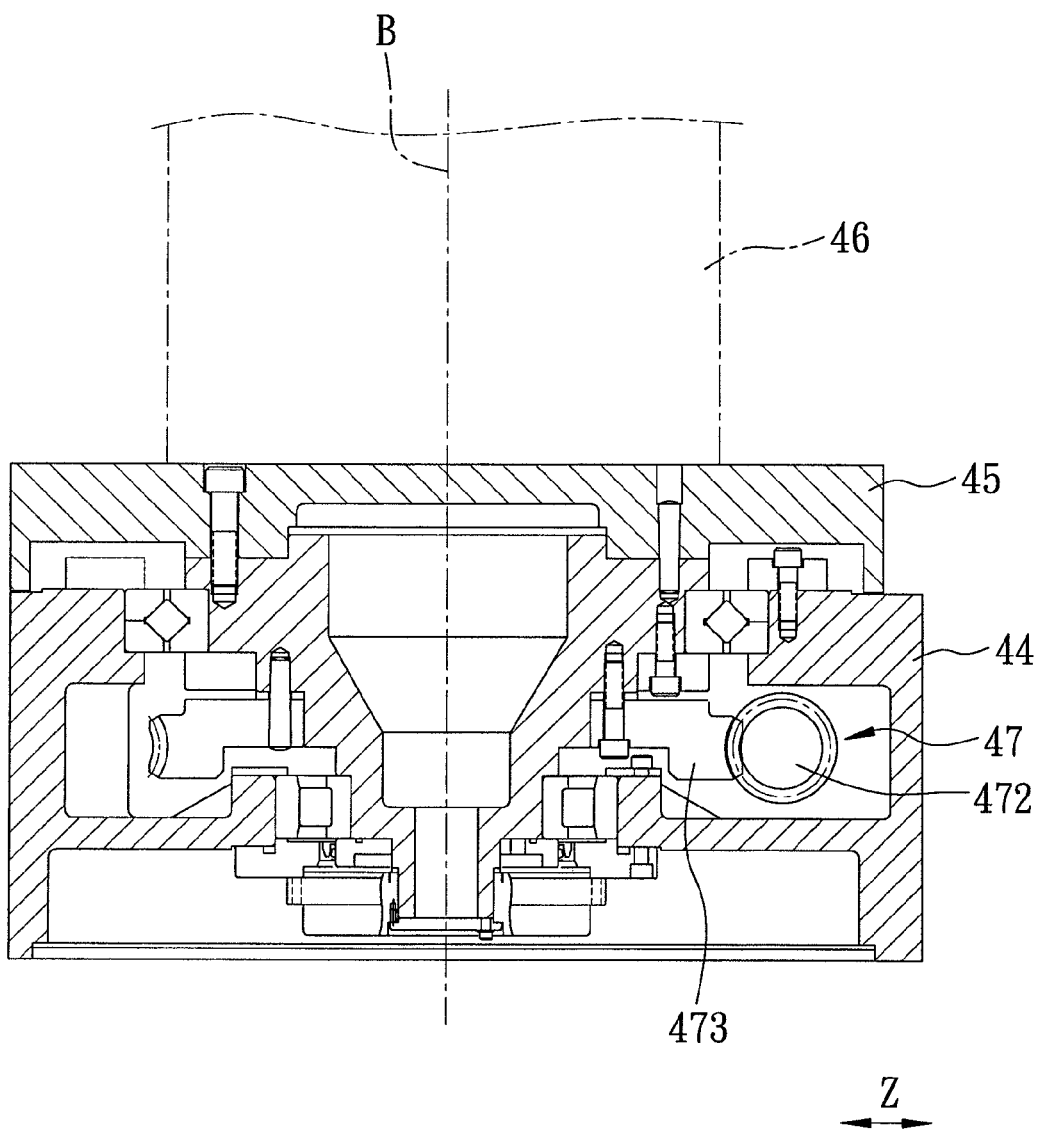
FIG. 6 is a sectional view taken along line VI-VI of FIG. 5.

The rotation drive mechanism 47 is disposed to drive the turntable platform 45 to revolve about the revolving axis (B). As shown in FIGS. 5 and 6, the rotation drive mechanism 47 includes a rotating power motor 471, a worm gear 472 which extends in the transverse direction (X), and which is driven to rotate by the rotating power motor 471, and a worm wheel 473 which is mounted to be rotatable with the turntable platform 45 about the revolving axis (B), and which is meshed with the worm gear 472 so as to permit the rotation power motor 471 to drive the turntable platform 45 to revolve about the revolving axis (B).

Figure 7:
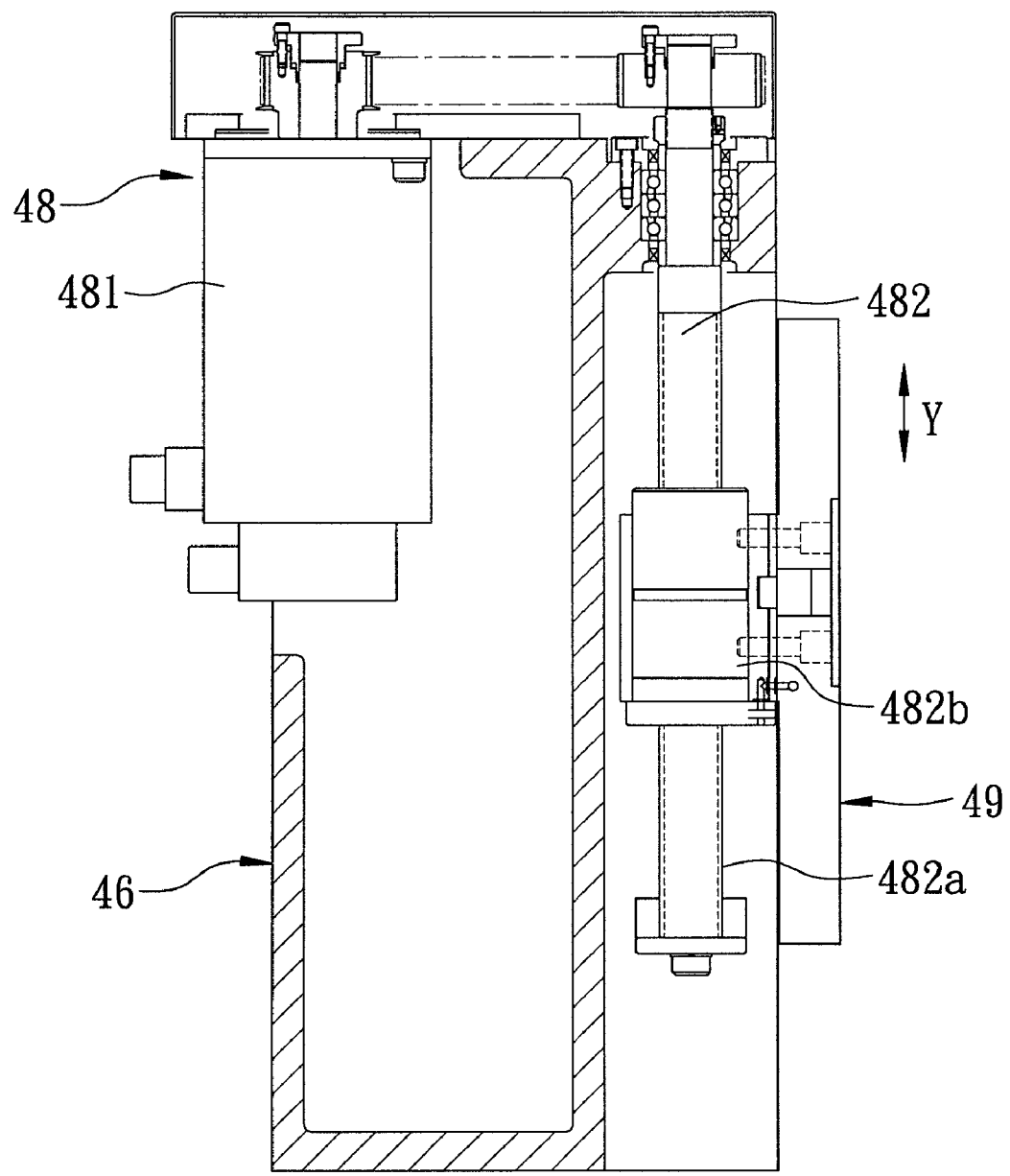
FIG. 7 is a sectional view taken along line VII-VII of FIG. 1.

The tool mounting post unit includes a base rest 46, a tool post 49, and a third linear motion drive mechanism 48. The base rest 46 is disposed on the turntable platform 45, and defines a third linear track in the upright direction (Y). The tool post 49 is mounted on the base rest 46 to be movable along the third linear track. As shown in FIG. 7, the third linear motion drive mechanism 48 includes a third power motor 481 and a third ball screw 482 having a third threaded shaft (482a) which extends along the third linear track, and which is driven to rotate by the third power motor 481, and a third ball bearing (482b) which is coupled to the third threaded shaft (481a). The tool post 49 is mounted on the third ball bearing (482b) so as to be moved along the third linear track.

The indexable turret 50 is disposed on the tool post 49 for holding a plurality of tool bits 51 and is rotatable about an indexing axis parallel to the spindle axis (C).

Referring once again to FIGS. 1, 3 and 5, when the spindle motor 21 is actuated to permit revolving of a workpiece held by the chuck 22, when the first power motor 111 is actuated to permit linear movement of the tool holding device 40, and when the second power motor 421 is actuated to drive linear movement of the cross-slide 43, the angularly displaceable unit, the rotation drive mechanism 47, the tool mounting post unit, and the turret 50, the workpiece can be machined using a selected one of the tool bits 51 held by the turret 50 in a cutting operation, such as lathing, planing, bore milling, or the like.

Moreover, when a workpiece is positioned to an angular position, and when the third power motor 481 is actuated, the workpiece can be machined using a selected one of the tool bits 51 held by the turret 50 in a cutting operation, such as milling, drilling, boring, sharpening, grinding, or the like.

Referring to FIGS. 2, 5 and 6, when the rotating power motor 471 is actuated to rotate the turntable platform 45 and the tool mounting post unit about the revolving axis (B), the angular position of the workpiece can be adjusted.

As illustrated, due to the provision of the first linear motion drive mechanism 11, the headstock unit 20 for rotating a workpiece about the spindle axis (C) or for positioning the workpiece at a desired angular position, the second linear motion drive mechanism 42 that permits the turret 50 to displace in the longitudinal, transverse and the upright directions (Z,X,Y) and to be rotatable about the revolving axis (B), the five-axis lathe can perform movements about five different axes simultaneously to machine a workpiece so as to obtain a product having a complicated geometric shape with precision in a single set-up, thereby reducing setup time and errors and increasing production.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A tool holding device for a five-axis lathe that includes
a machine bed which defines a first linear track extending in a longitudinal direction, and which is provided with a first linear motion drive mechanism,
a headstock unit mounted on one side of the machine bed, and having a spindle for holding a workpiece and revolving about a spindle axis that is oriented in the longitudinal direction, and
a tailstock unit mounted on the other side of the machine bed for supporting an outboard end of the workpiece along the spindle axis, said tool holding device comprising:
a saddle which is disposed between said headstock unit and said tailstock unit, and which is adapted to be driven by the first linear motion drive mechanism to move along the first linear track, said saddle defining a second linear track in a direction transverse to the longitudinal direction;
a cross-slide which is configured to ride on said saddle to be movable along the second linear track, and which has an upper major wall facing upwardly;
a second linear motion drive mechanism disposed to drive said cross-slide to move along the second linear track;
an angularly displaceable unit which includes
a base mount having a bottom major mount surface which is disposed on said upper major wall of said cross-slide, and a top major mount surface which is opposite to said bottom major mount surface in an upright direction that is transverse to both said longitudinal and transverse directions, and
a turntable platform which is disposed on said top major mount surface of said base mount and which is revolvable about a revolving axis in the upright direction;
a rotation drive mechanism disposed to drive said turntable platform to revolve about the revolving axis; and
a tool mounting post unit including
a base rest which is disposed on said turntable platform, and which defines a third linear track in the upright direction,
a tool post which is adapted to hold a tool bit, and which is mounted on said base rest to be movable along the third linear track, and
a third linear motion drive mechanism disposed to drive said tool post to move along the third linear track.

2. The tool holding device according to claim 1, further comprising an indexable turret disposed on said tool post for holding a plurality of tool bits and rotatable about an indexing axis which is parallel to the spindle axis.

3. The tool holding device according to claim 1, wherein said second linear motion drive mechanism includes
   a second power motor, and
   a second ball screw having a second threaded shaft which extends along the second linear track, and which is driven to rotate by said second power motor, and a second ball bearing which is coupled to said second threaded shaft, and which is mounted on said cross-slide so as to permit said cross-slide to be moved along the second linear track.

4. The tool holding device according to claim 1, wherein said third linear motion drive mechanism includes
   a third power motor, and
   a third ball screw having a third threaded shaft which extends along the third linear track, and which is driven to rotate by said third power motor, and a third ball bearing which is coupled to said third threaded shaft, and which is mounted on said tool post so as to permit said tool post to be moved along the third linear track.

5. The tool holding device according to claim 1, wherein said rotation drive mechanism includes
   a rotating power motor,
   a worm gear which extends in the transverse direction, and which is driven to rotate by said rotating power motor, and
   a worm wheel which is mounted to be rotatable with said turntable platform about the revolving axis, and which is meshed with said worm gear so as to permit said rotation power motor to drive said turntable platform to revolve about the revolving axis.

\* \* \* \* \*